(12) United States Patent
Ba

(10) Patent No.: US 9,875,109 B2
(45) Date of Patent: Jan. 23, 2018

(54) METHOD AND APPARATUS FOR GENERATING USER ADAPTIVE APPLICATION IN MOBILE TERMINAL

(75) Inventor: Sanjeev Ba, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 495 days.

(21) Appl. No.: 13/018,870

(22) Filed: Feb. 1, 2011

(65) Prior Publication Data

US 2011/0191790 A1    Aug. 4, 2011

(30) Foreign Application Priority Data

Feb. 4, 2010   (KR) ........................ 10-2010-0010563

(51) Int. Cl.
  G06F 13/00   (2006.01)
  G06F 17/00   (2006.01)
  G06F 9/44    (2006.01)
  G06F 9/445   (2006.01)

(52) U.S. Cl.
  CPC .................. G06F 9/44 (2013.01); G06F 8/30 (2013.01); G06F 9/44521 (2013.01)

(58) Field of Classification Search
  None
  See application file for complete search history.

(56) References Cited

U.S. PATENT DOCUMENTS

| | | | |
|---|---|---|---|
| 6,594,819 B1* | 7/2003 | Ciarlante et al. ............. | 717/177 |
| 7,168,035 B1* | 1/2007 | Bell .................... | G06F 17/2247 715/234 |
| 7,415,672 B1* | 8/2008 | Fortini ................ | G06F 17/2247 715/760 |
| 8,290,442 B2* | 10/2012 | Whatmough et al. ..... | 455/67.11 |
| 8,493,339 B1* | 7/2013 | Feehan ................. | G06F 3/1423 345/173 |
| 2002/0002509 A1* | 1/2002 | Wagorn et al. ................. | 705/26 |
| 2006/0080635 A1* | 4/2006 | Anwar et al. ................. | 717/100 |
| 2006/0229099 A1* | 10/2006 | Chen et al. ................ | 455/556.1 |

(Continued)

FOREIGN PATENT DOCUMENTS

| KR | 1020050057822 | 6/2005 |
|---|---|---|
| KR | 1020060007699 | 1/2006 |
| KR | 1020070047932 | 5/2007 |

OTHER PUBLICATIONS

Microsoft, "Create a custom list form using SharePoint Designer", 2010, pp. 1-11.*

(Continued)

*Primary Examiner* — Lechi Truong
*Assistant Examiner* — Phuong N Hoang
(74) *Attorney, Agent, or Firm* — The Farrell Law Firm, P.C.

(57) ABSTRACT

A method and apparatus for generating a user adaptive application in a mobile terminal are provided. The method includes displaying a list of applications in the mobile terminal and displaying a list of services provided by at least one of the applications in the mobile terminal from among lists of services provided by each of the applications in the mobile terminal, receiving a selection of at least one service for an operation of a desired application module from among the displayed list of services, dynamically loading library modules for performing the selected services, and generating a specific application by combining the loaded library modules.

25 Claims, 5 Drawing Sheets

(56) References Cited

U.S. PATENT DOCUMENTS

2008/0019353 A1* 1/2008 Foote ........................... 370/352
2008/0125103 A1* 5/2008 Mock ........................... 455/418
2008/0201653 A1* 8/2008 Khandekar .................. 715/765
2008/0307320 A1* 12/2008 Payne et al. ................. 715/751
2009/0013280 A1* 1/2009 Ballard .............. G06Q 30/0603
                                                                       715/783

OTHER PUBLICATIONS

Korean Office Action dated Feb. 22, 2016 issued in counterpart application No. 10-2010-0010563, 8 pages.

* cited by examiner

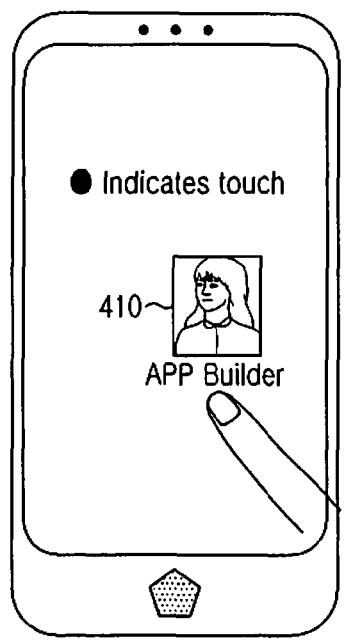 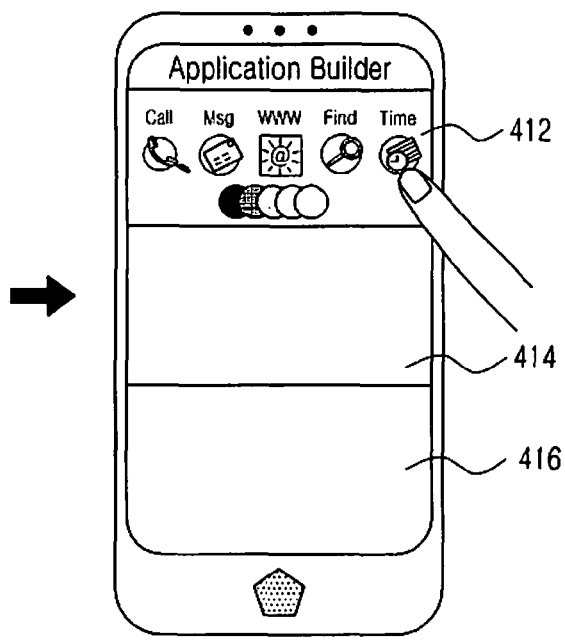
FIG.4A          FIG.4B
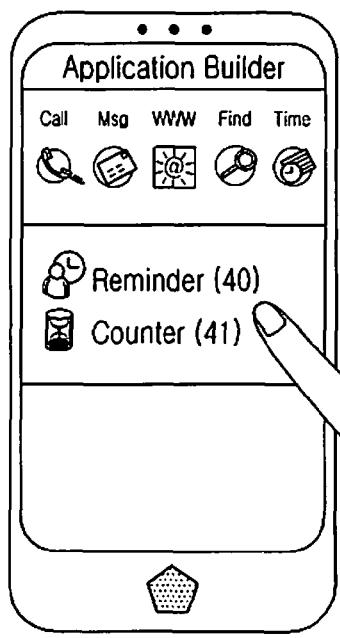 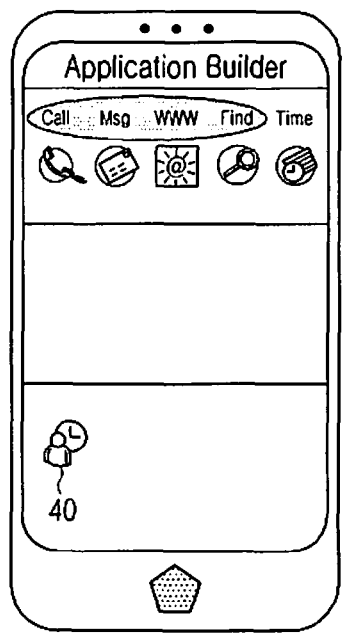
FIG.4C          FIG.4D

METHOD AND APPARATUS FOR GENERATING USER ADAPTIVE APPLICATION IN MOBILE TERMINAL

PRIORITY

This application claims priority under 35 U.S.C. §119(a) of a Korean Patent Application filed in the Korean Intellectual Property Office on Feb. 4, 2010 and assigned Ser. No. 10-2010-0010563, the entire contents of which are incorporated herein by reference.

BACKGROUND OF THE INVENTION

1. Field of the Invention

The present invention relates generally to a mobile terminal with a touch screen, and more particularly, to a method and apparatus for generating a user adaptive application using a service manager.

2. Description of the Related Art

Various technical advances in mobile devices have enabled mobile communication terminals to carry out various multimedia functions in addition to performing a simple telephone call function and accessing the Internet. In particular, devices having a Personal Digital Assistant (PDA) function, such as smart phones, are equipped with a wireless Internet platform that supports an operating environment of various software applications, thereby providing users with service functions using data communication between remote users and using JAVA™ (hereinafter, "Java") programming language-based various applications.

Users of smart phones may download application software via a Third Generation (3G) wireless Internet network or Wireless Fidelity (Wi-Fi), using platforms specified according to manufacturers, for example, Apple's iPhone, Google's Android, and Nokia's Symbian platforms, thereby utilizing the downloaded software in their respective phones in various ways.

However, since an application download service is limited to downloading only the applications developed by application developers, increasing user demands may not be satisfied. Further, when users directly generate applications having desired functions, since users may not skillfully use a platform that provides an operating environment of the application, the users may have difficulty generating the applications.

FIG. 1 is a block diagram illustrating a configuration of a conventional mobile terminal for performing an application downloaded through a wireless network.

As shown in FIG. 1, a conventional mobile terminal 100 includes hardware 124, an Operation System (OS) and device driver layer 122, a plurality of application software modules such as a telephony module 114, a networking module 116, a security module 118 and a User Interface (UI) module 120, an Application Program Interface (API) layer 112, and an application 110. The OS and device driver layer 122 provides an interface so that the application 110 can control the hardware 124. The API layer 112 is used when the application 110 communicates with the OS and device driver layer 122. The application 110 is an application program of an EXEcutable (EXE) form that performs a specific function in the mobile terminal 100.

The conventional mobile terminal 100, however, does not provide a construction in which a user can easily interface with the application modules. Hence, when using applications or when generating a desired application other than applications provided by a developer, a general user may not skillfully use a platform that provides an operating environment of the applications and may use only applications provided by a developer.

SUMMARY OF THE INVENTION

An aspect of the present invention is to address at least the above-mentioned problems and/or disadvantages and to provide at least the advantages described below. Accordingly, an aspect of the present invention provides a method and apparatus for generating an application of a desired form using applications downloaded in a mobile terminal irrespective of whether a user is able to generate an application using a predetermined programming language.

In accordance with an aspect of embodiments of the present invention, a method for generating a user adaptive application in a mobile terminal includes displaying a list of applications in the mobile terminal and displaying a list of services provided by at least one of the applications in the mobile terminal from among lists of services provided by each of the applications in the mobile terminal, receiving a selection of at least one service for an operation of a desired application module from among the displayed list of services, dynamically loading library modules for performing the selected services, and generating a specific application by combining the loaded library modules.

In accordance with another aspect of embodiments of the present invention, an apparatus for generating a user adaptive application in a mobile terminal includes a service manager for displaying a list of applications in the mobile terminal and at least one list of services provided by each of the applications, dynamically loading library modules of services selected from among the displayed list of services, and generating a specific application by combining the loaded library modules, an application builder for providing the service manager with an interface routine corresponding to a service function provided by the specific application based on an eXtensible Markup Language (XML), and a database for storing an interface routine corresponding to each service function, and for storing selected applications or a list of services provided by the selected application.

BRIEF DESCRIPTION OF THE DRAWINGS

The above and other aspects, features and advantages of certain embodiments of the present invention will be more apparent from the following description taken in conjunction with the accompanying drawings, in which:

FIGS. 4A to 4H are diagrams illustrating a schematic operation of a mobile terminal to which a method for generating a user adaptive application is applied according to an embodiment of the present invention.

Throughout the drawings, the same drawing reference numerals will be understood to refer to the same elements, features and structures.

DETAILED DESCRIPTION OF EMBODIMENTS

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

A mobile terminal according to an embodiment of the present invention includes a touch type screen. In order for a user to generate a desired application other than applications provided by a developer, the user may not be able to skillfully use a platform of a middleware that provides an API needed for the development of the application. Accordingly, a mobile terminal according to an embodiment of the present invention provides a customized application development kit based on an eXtensible Markup Language (XML) and enables a user to easily generate a desired application by interfacing with command language modules of predefined services using the development kit when generating the application.

The application development kit, which represents a series of programs used when developers develop applications, will be referred to as a service manager and an application builder. The application development kit mainly refers to, but is not limited to, Software Developer's Kits (SDKs) used by Microsoft, Sun Microsystems, etc., for example.

Figure 1:
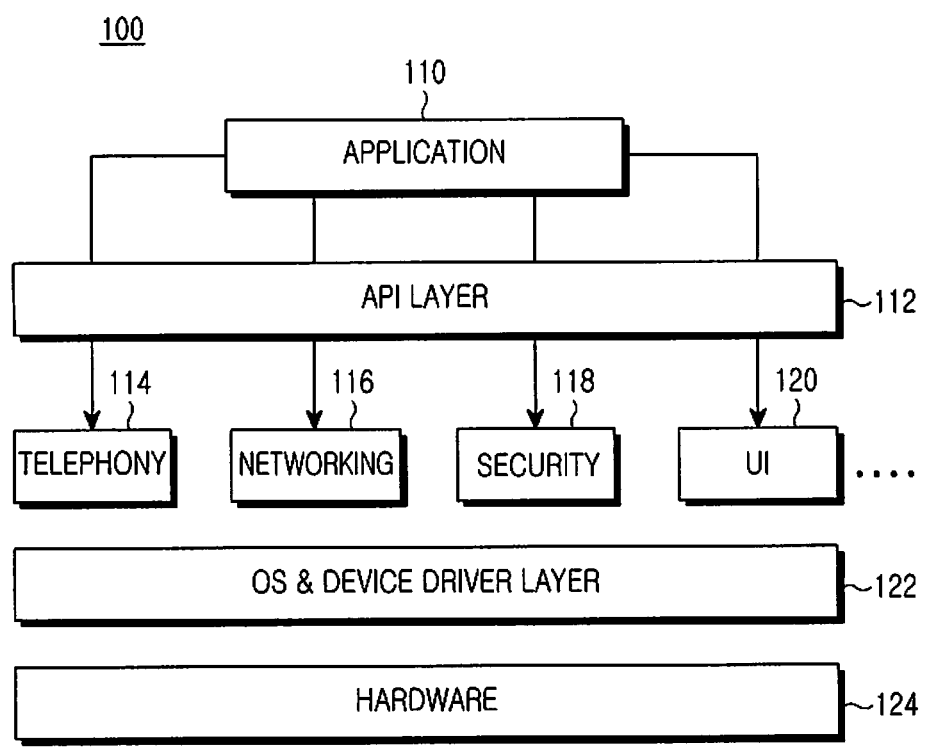
FIG. 1 is a block diagram illustrating a configuration of a conventional mobile terminal for performing an application downloaded through a wireless network.
Figure 2:
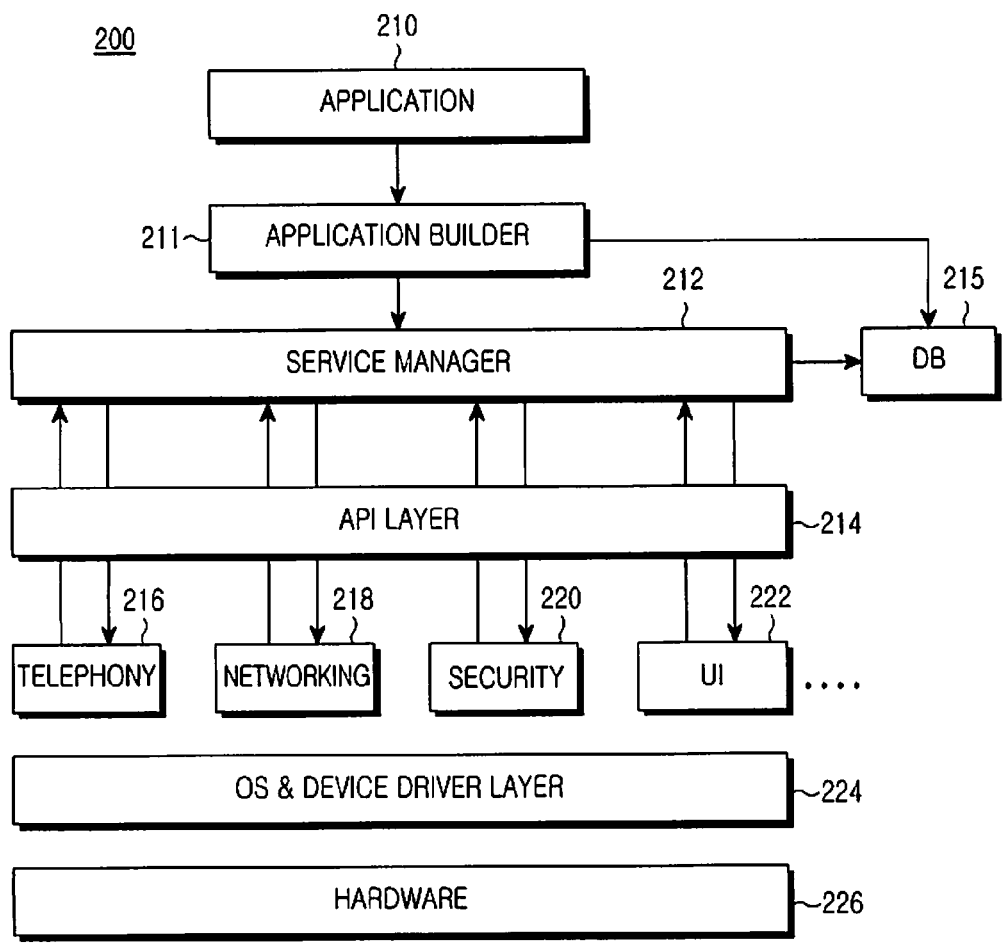
FIG. 2 is a block diagram illustrating a configuration of an apparatus for generating a user adaptive application in a mobile terminal according to an embodiment of the present invention.

FIG. 2 is a block diagram illustrating a configuration of an apparatus for generating a user adaptive application in a mobile terminal according to an embodiment of the present invention.

Referring to FIG. 2, an apparatus 200 for generating a user adaptive application in a mobile terminal according to an embodiment of the present invention includes a plurality of applications 210, an application builder 211, a DataBase (DB) 215, a service manager 212, an API layer 214, a plurality of application software modules 216, 218, 220, and 222, an OS and device driver layer 224, and hardware 226.

The OS and device driver layer 224 provides an interface so that the applications 210 can control the hardware 226. The software modules include a telephony module 216, a networking module 218, a security module 220, and a UI module 222. The API layer 214 denotes a language or message format used when the applications 210 communicate with the OS and device driver layer 224.

The service manager 212 displays lists of all applications downloaded by the mobile terminal and lists of services provided by each respective application, dynamically loads a corresponding library modules of services selected by a user from among the displayed service lists, and combines the loaded library modules to generate a specific application. The service manager 212 divides a display area of the mobile terminal into a first area for displaying entire application lists, a second area for displaying service lists provided by a specific application selected by a user from among the entire applications displayed on the first area, and a second sub-area for reviewing a specific service selected by a user among the service lists displayed on the second area. If a user requests generation of an application, the service manager 212 displays application lists or service lists provided by a specific application on the divided display area and dynamically loads API libraries corresponding to application modules of services displayed on the second sub-area, thereby generating an application.

The service manager 212 assigns Identifiers (IDs) to applications generated by dynamically loading library modules of services and classifies the generated applications according to the assigned IDs to store the classified applications in the DB 215.

The library module is a module in which an API necessary for generating an application is present and indicates an XML-based predefined command language module.

The application builder 211 provides the service manager 212 with an XML-based interface routine corresponding to at least one service provided by each application 210. The DB 215 stores an interface routine for each service function generated from the service manager 212, and applications selected by a user or service lists provided by the applications. The applications 210 are EXEcutable (EXE) application programs for performing specific functions in the mobile terminal.

Figure 3:
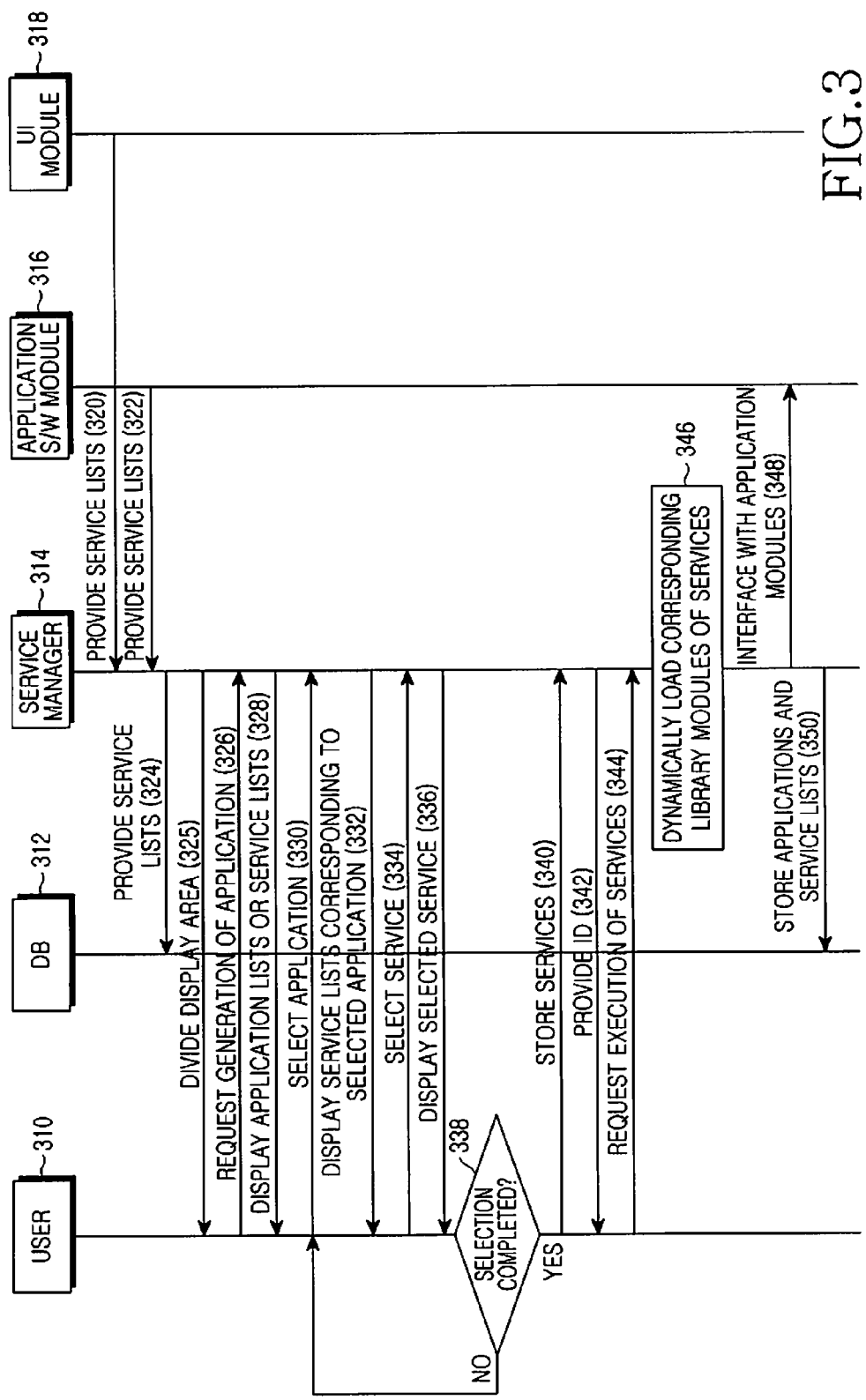
FIG. 3 is a flow chart illustrating a method for generating a user adaptive application in a mobile terminal according to an embodiment of the present invention.

A method for generating the user adaptive application, based on FIG. 3, is described as follows with reference to FIGS. 4A to 4H.

FIG. 3 is a flow chart illustrating a method for generating a user adaptive application in a mobile terminal according to an embodiment of the present invention.

Referring to FIG. 3, a UI module 318, which forms entire frames of applications selected from among a plurality of application software modules corresponding to a plurality of applications embedded or downloaded in the mobile terminal, provides service lists for generating a specific application to a service manager 314 when applications are displayed in a display area of the mobile terminal. The service lists may include lists corresponding to a screen layout, UI objects to be inserted, and texts/images.

In step 322, another software module, for example, an application managed by software module 316, which is in charge of a call service of the mobile terminal, provides the service manager 314 with service lists for the generation, transfer, reject, charge search, and option setting of the call service.

Steps 320 and 322 may be automatically performed during an initial driving (i.e., an initial start-up and/or power-on) of the mobile terminal or may be performed at the request of a user.

In step 324, the service manager 314 transmits service lists received from a plurality of application software modules 316 to a DB 312 so as to store the service lists according to the application software modules.

In step 325, the service manager 314 divides a display area of the mobile terminal into a first area for displaying entire application lists, a second area for displaying service lists provided by a specific application selected by a user among the entire application lists, and a second sub-area for reviewing a specific service selected by a user among the service lists displayed on the second area.

When a user 310 requests generation of an application in step 326, the service manager 314 sequentially displays application lists or service lists provided by an application on a corresponding area of the display area according to the selection of the user 310 in step 328.

More specifically, if the user 310 selects a specific application from among all of the applications displayed on the first area in step 330, the service manager 314 displays service lists corresponding to the selected application on the second area of the mobile terminal in step 332 by extracting the service lists from the DB 312 that stores service lists according to application software modules.

If the user 310 selects at least one service from the service lists displayed on the second area in step 334, the service manager 314 controls the DB 312 to store the selected service and displays the selected service on the second area in step 336.

According to the method illustrated in FIG. 3, the application lists or service lists may be displayed on each area of the display area of the mobile terminal in the form of icons or corresponding service names (e.g., "Reminder", "Counter", "Time," etc.). Through steps 328 to 336, the application lists or the corresponding service lists of applications are sequentially displayed on a corresponding area of the display area of the mobile terminal according to an order selected by a user and services selected finally by the user are displayed on the second sub-area of the display area.

In other words, in steps 328 through 336, the service manager 314 displays, on the second sub-area, services selected by a user through the application lists and the service lists on the first and second areas, so that the user can review service functions to be provided by an application to be generated.

The user 310 inputs a confirm of at least one service displayed on the second sub-area, and steps 330 to 360 are repeated until all of the services to be combined for a desired application are displayed. When the services to be combined for a desired application are all displayed on the second sub-area, the user 310 informs the service manager 315 that the selection of the services is completed through input of a specific key button of the mobile terminal or by touching a prescribed area of the display area, in step 338. The service manager 314 then controls the DB 312 to sequentially store applications selected by a user on the first and second areas and services provided by the selected applications according to a selected order, in step 340.

As described above, the service manager 314 combines service lists displayed sequentially on the second sub-area according to an order selected from applications on the first area and service lists provided by the selected applications and controls the DB 312 to store combined services in step 340. The service manager 314 generates an application ID for the combined services stored in the DB 312 and informs the user 310 of the ID in step 342.

Throughout the repeated operations of steps 330 through 336, respective services having the same ID in step 342 are services corresponding to different applications, because the services in step 342 are selected from different applications through different iterations of the repeated operations of steps 330 to 336.

If the user 310 inputs an application ID to request the execution of services corresponding to the input ID in step 344, the service manager 314 dynamically loads corresponding library modules of the respective services in step 346.

The library modules are constructed with interface functions for performing each service provided by an application and include an API library necessary to generate a corresponding application.

The API library is a standard library for generating an application in an OS environment embedded in the mobile terminal and interfaces with a predefined XML-based command language module to perform a corresponding service in each application software module. The service manager 314 causes the mobile terminal to perform an application to be generated by a user by extracting command language modules corresponding to services selected by the user from application software modules; i.e., the service manager 314 interfaces with application modules corresponding to services selected by the user to perform the services in step 348.

Applications executed in step 348 and service lists provided by the applications according to application modules are stored in the DB 312 in step 350.

A schematic operation of the mobile terminal to which the operating process of FIG. 3 is applied is shown in FIGS. 4A to 4H.

FIGS. 4A to 4H are diagrams illustrating a schematic operation of a mobile terminal to which a method for generating a user adaptive application is applied according to an embodiment of the present invention.

As illustrated in FIG. 4A, if a user touches an application builder icon 410 located in a prescribed area of the mobile terminal, a display area of the mobile terminal is divided into a first area 412 for displaying entire application lists, a second area 414 for displaying a list of services provided by a specific application selected by the user from among all of the applications displayed on the first area 412, and a second sub-area 416 for reviewing a specific service selected by the user from among the service list displayed on the second area 414. As illustrated in FIG. 4B, the entire application lists are displayed on the first area 412. A user may view and confirm all of the applications in the entire application lists through left and right scrolling on the first area 412.

If a user selects a specific application, for example, "Time" from among the entire application lists displayed on the first area 412, service lists, for example, a "Reminder" 40 and a "Counter" 41 provided by the selected specific application are displayed on the second display area 414 as shown in FIG. 4C.

Thereafter, a specific service, for example, the "Reminder" 40, selected by the user from among the displayed listed services on the second area 414, is displayed on the second sub-area 416 as shown in FIG. 4D. Displaying the selected specific service on the second sub-area 416 is to allow a user to review a corresponding service to be included in an application to be generated.

Figures 4E, 4F:
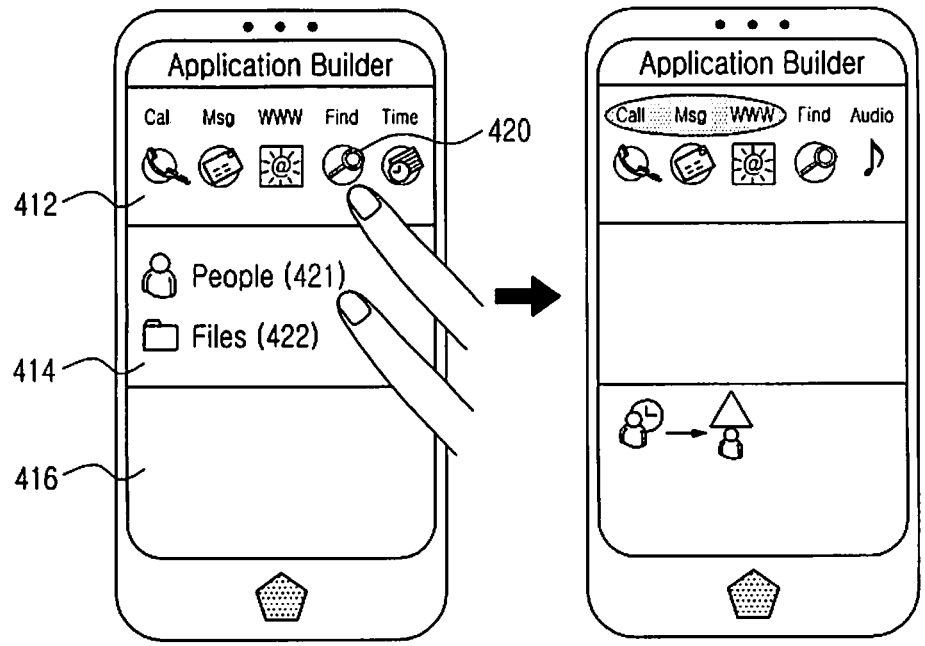

As shown in FIG. 4E, if a user selects a specific application, for example, "Find" from among the entire application lists displayed on the first area 412, service lists corresponding to the selected application "Find", including icons or names for "People" 421 and "Files" 422 are displayed on the second area 414.

Next, a specific service, for example, the "People" 421 selected by the user from among the service lists displayed on the second area 414 is displayed on the second sub-area 416 as shown in FIG. 4F.

Figures 4G, 4H:
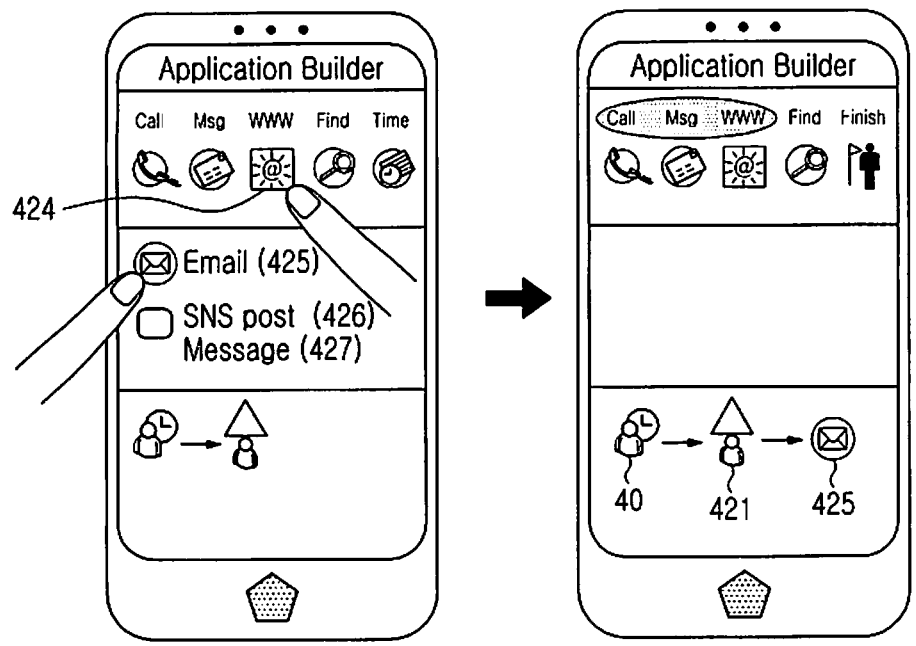

If a user selects a specific application, for example, a "WWW" application 424 from among the entire application lists displayed on the first area 412, service lists corresponding to the selected specific application "WWW" 424, such as "Email" 425, "SNS" 426 and "Message" 427 are displayed on the second display area 414 as shown in FIG. 4G. Herein, "SNS" refers to a Social Networking Service.

As shown in FIG. 4H, a specific service, for example, the "Email" service 425 selected by the user among the service lists 425, 426, and 427 displayed on the second area 414 is displayed on the second sub-area 416 to review a corresponding service to be included in a desired application. Sequentially displayed service lists are located on the second sub-area, which include the "Reminder" 40, "People" 421, and "Email" 425 provided by the applications selected by a user through processes shown in FIGS. 4A to 4H.

As a result of the user's selections, a new application is generated by combining one or more service lists, such as the "Alarm" 40, "People" 421, and "Email" 425 displayed on the second sub-area 416. The application generated by a combination of the "Alarm" 40, "People" 421, and "Email" 425 performs a function for searching specific people stored in the mobile terminal using a people search service and transmitting E-mails to the searched people at a specific time using an E-mail service and an alarm service.

According to embodiments of the present invention, an application having a function desired by a user may be generated by combining respective predefined XML-based service function modules. Therefore, users may easily generate an application having a desired function without requiring knowledge and use of a particular programming language. Embodiments of the present invention also include computer-readable recording mediums for recording programs executed by computers, the programs including instructions arranged, when executed, to implement methods according to embodiments of the present invention, and further include processors for executing operations performed to implement methods according to embodiments of the present invention.

Although the embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A method for generating a user adaptive application in a mobile terminal, the method comprising:
    dividing a display area of the mobile terminal into a first area, a second area, and a third area, upon receiving a request for generation of an application;
    displaying a list of applications in the first area of the display area;
    displaying a list of services provided by at least one of the applications selected from among applications displayed in the first area into the second area, wherein each service corresponds to a respective service function module for providing the service;
    receiving a selection of a plurality of services from among the displayed list of services;
    displaying the selected plurality of services in the third area of the display area, wherein the third area reviews a specific service selected from among the list of services displayed in the second area; and
    generating a new application by combining the service function modules corresponding to the selected services;
    wherein generating the new application comprises:
        upon receiving a request for completing generation of the new application, sequentially storing the selected services;
        dynamically loading library modules for performing the selected services;
        combining the loaded library modules to construct a service list of the new application to be generated and outputting an application IDentifier (ID) corresponding to the constructed service list;
        upon receiving a request for execution of an application using an application ID, searching for the application corresponding to the received application ID; and
        interfacing at least one application module of at least one service combined in the application corresponding to the search.

2. The method of claim 1, further comprising: upon receiving a request for execution of the generated new application, executing the requested application by sequentially loading the library modules combined in the generated new application.

3. The method of claim 1, wherein the library modules are constructed with interface functions for executing each of the selected services.

4. The method of claim 1, wherein the library modules include an Application Program Interface (API) required to generate the new application.

5. The method of claim 4, wherein the library modules including the API are predefined command language modules based on eXtensible Markup Language (XML).

6. The method of claim 1, wherein the new application is generated based on a user interface module previously stored in a platform for driving the new application.

7. The method of claim 6, wherein the user interface provides at least one interface for a screen layout of an application to be generated, objects to be inserted, and at least one of texts and images.

8. The method of claim 1, further comprising:
    upon generation of a user selection for at least one service among the list of services displayed on the second area, activating an application that can be selected among the list of applications displayed on the first area so as to be guided to a user.

9. The method of claim 1, wherein the new application is further generated by combining the service function modules corresponding to each application according to a selection order of the selected services.

10. The method of claim 1, wherein, when one of the selected services is an alarm service, the generated new application performs another one of the selected services at a specific time according to the alarm service.

11. The method of claim 1, wherein, when one of the selected services is a people search service, the generated new application performs another one of the selected services with respect to people found as a result of performing the people search service.

12. The method of claim 1, wherein, when one of the selected services includes an E-mail service, the generated new application transmits E-mails according to an operation of another one of the selected services.

13. An apparatus for generating a user adaptive application in a mobile terminal, the apparatus comprising:
    a processor configured to:
        divide a display area of the mobile terminal into a first area and, a second area, and a third area, upon receiving a request for generation of an application,
        display a list of applications inte the first area of the display area,
        display a list of services, provided by at least one of the applications selected from among applications displayed in the first area, into the second area, wherein each service corresponds to a respective service function module for providing the service,
        receive a selection of a plurality of services from among the displayed list of services,
        display the selected plurality of services in the third area of the display area, wherein the third area reviews a specific service selected from among the list of services displayed in the second area, and
        generate a new application by combining the service function modules corresponding to the selected services; and
    a memory configured to store at least one of the selected applications or the list of services provided by the at least one of the selected applications;
    wherein generating the new application comprises:
        upon receiving a request for completing generation of the new application, sequentially storing the selected services;
        dynamically loading library modules for performing the selected services;

combining the loaded library modules to construct a service list of the new application to be generated and outputting an application IDentifier (ID) corresponding to the constructed service list;

upon receiving a request for execution of an application using an application ID, searching for the application corresponding to the received application ID; and interfacing at least one application module of at least one service combined in the application corresponding to the search.

14. The apparatus of claim 13, wherein the processor is further configured to provide an interface routine corresponding to a service function provided by the new application, wherein the memory further stores an interface routine corresponding to each service function.

15. The apparatus of claim 14, wherein the processor comprises:

an operating system and device driver layer for providing an interface so that an application can control a hardware of the mobile terminal;

a plurality of application software modules for performing a specific function in the operating system and device driver layer; and an Application Program Interface (API) layer for providing interfacing for communication between the application and the operating system and device driver layer.

16. The apparatus of claim 14, wherein the processor is further configured to assign an IDentifier (ID) to the new application and control a database to store applications classified according to assigned IDs.

17. The apparatus of claim 14, wherein the library modules include an API necessary to generate the application.

18. The apparatus of claim 17, wherein the library modules including the API are predefined command language modules based on eXtensible Markup Language (XML).

19. The apparatus of claim 14, wherein the library modules are constructed with interface functions for executing services provided by the application.

20. The apparatus of claim 14, wherein the new application is generated based on a user interface module previously stored by a service manager function in a platform for driving the new application.

21. The apparatus of claim 13, wherein the new application is further generated by combining the service function modules corresponding to each application according to a selection order of the selected services.

22. The apparatus of claim 13, wherein, when one of the selected services is an alarm service, the generated new application performs another one of the selected services at a specific time according to the alarm service.

23. The apparatus of claim 13, wherein, when one of the selected services is a people search service, the generated new application performs another one of the selected services with respect to people found as a result of performing the people search service.

24. The apparatus of claim 13, wherein, when one of the selected services includes an E-mail service, the generated new application transmits E-mails according to an operation of another one of the selected services.

25. A non-transitory computer readable recording medium for recording a program executed by a computer, the program comprising instructions arranged, when executed, to implement a method comprising:

dividing a display area of the mobile terminal into a first area and, a second area, and a third area, upon receiving a request for generation of an application;

displaying a list of applications in the first area of the display area;

displaying a list of services provided by at least one of the applications selected from among applications displayed in the first area into the second area, wherein each service corresponds to a respective service function module for providing the service;

receiving a selection of a plurality of services from among the displayed list of services;

displaying the selected plurality of services in the third area of the display area, wherein the third area reviews a specific service selected from among the list of services displayed in the second area; and generating a new application by combining the selected services;

wherein generating the new application comprises:

upon receiving a request for completing generation of the new application, sequentially storing the selected services;

dynamically loading library modules for performing the selected services;

combining the loaded library modules to construct a service list of the new application to be generated and outputting an application IDentifier (ID) corresponding to the constructed service list;

upon receiving a request for execution of an application using an application ID, searching for the application corresponding to the received application ID; and interfacing at least one application module of at least one service combined in the application corresponding to the search.

* * * * *